United States Patent
Shteyn et al.

(10) Patent No.: US 6,933,432 B2
(45) Date of Patent: Aug. 23, 2005

(54) MEDIA PLAYER WITH "DJ" MODE

(75) Inventors: Eugene Shteyn, Cupertino, CA (US);
Willem Bulthuis, Portola Valley, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 10/112,155

(22) Filed: Mar. 28, 2002

(65) Prior Publication Data

US 2003/0183064 A1 Oct. 2, 2003

(51) Int. Cl.$^7$ ................................................ G10H 7/00
(52) U.S. Cl. .................................... 84/609; 84/649
(58) Field of Search .................. 84/600–604, 609–613, 84/647–654, 615, 616, 618, 633, 634–637, 656, 665–669

(56) References Cited

U.S. PATENT DOCUMENTS

| | | |
|---|---|---|
| 5,295,123 A | 3/1994 | Seri et al. |
| 5,386,081 A | 1/1995 | Nakada et al. |
| 5,616,876 A | 4/1997 | Cluts |
| 5,747,716 A | 5/1998 | Matsumoto |
| 5,877,445 A | 3/1999 | Hufford |
| 5,963,957 A | 10/1999 | Hoffberg |
| 5,986,200 A | 11/1999 | Curtin |
| 6,066,792 A * | 5/2000 | Sone ........................... 84/609 |
| 6,243,725 B1 | 6/2001 | Hempleman et al. |
| 6,344,607 B2 * | 2/2002 | Cliff ........................... 84/611 |
| 6,545,209 B1 * | 4/2003 | Flannery et al. .............. 84/609 |
| 2002/0181711 A1 * | 12/2002 | Logan et al. .................. 381/1 |
| 2003/0045954 A1 * | 3/2003 | Weare et al. ................. 700/94 |

* cited by examiner

*Primary Examiner*—Marlon T. Fletcher
*Assistant Examiner*—David S. Warren
(74) *Attorney, Agent, or Firm*—Kevin Simons

(57) ABSTRACT

A sequential playback system is configured to select each sequential song based upon characteristics of an ending segment of each preceding song. Songs are selected based on the characteristics of the overall theme of the selection, if any, and also based on a musical correspondence between songs. The correspondence may be based on the rhythm of each song, the notes and chords of each song, and other musical characteristics of the songs. The end segment of each selected song is characterized, and the first segment of a candidate song that satisfy the overall selection criteria is compared to this characterization to determine a correspondence. If the first segment of the candidate song is inconsistent with the end segment of the previously selected song, another candidate song is found that satisfies the overall selection criteria, and the first segment of this new candidate song is compared to the characterization. This process continues until a suitable candidate song is identified, or until a time limit is exceeded. Transition pieces are optionally provided to facilitate a smooth transition between songs.

27 Claims, 1 Drawing Sheet

MEDIA PLAYER WITH "DJ" MODE

BACKGROUND OF THE INVENTION

1. Field of the Invention

This invention relates to the field of consumer electronics, and in particular to a player device that provides rhythm-synchronized sequential playback of a music collection, emulating the music selection and synchronization actions of a "disk-jockey", or "DJ".

2. Description of Related Art

Technologies exist that allow a consumer to access large collections of music. On a typical computer system with a Compact Disk (CD) player and giga-bytes of disk memory, for example, a user can record hundreds or thousands of songs in MPEG format. Portable MP3 players are available that can store hours of music; multi-disk CD players are available that can accommodate hundreds of CDs; subscription services are available that allow users access to a virtually unlimited amount of music via the Internet; and so on.

Most playback devices that have access to a collection of music include options for automated playback, and particularly, an option for "random" or "shuffle" playback. Some systems allow for a selective playback of a subset of the collection of music, based on one or more characteristics associated with each song. For example, a user may request a random playback of "rock" songs, or "oldies", or "classics", and so on. A variety of systems are available that provide for the characterizing and cataloguing of songs to facilitate an efficient selection process.

U.S. Pat. No. 5,616,876, "SYSTEM AND METHODS FOR SELECTING MUSIC ON THE BASIS OF SUBJECTIVE CONTENT", issued Apr. 1, 1997 to Jonathan C. Cluts, and incorporated by reference herein, presents a characterization system wherein a plurality of subjective characteristics are used to characterize music pieces. A user of the system is provided a set of slider-bars corresponding to each characteristic. For example, a characteristic may be "gender". If a user currently prefers female singers, the user adjusts the slider-bar of the gender characteristic toward "female", depending upon how strongly the user's current preference is. Another characteristic may be "beat", and the user adjusts the corresponding slider-bar between fast and slow. Songs in a collection are characterized by the gender(s) of the performer(s), and the beat of the song. When set to automatically play songs from the collection, the songs that have characteristics that correspond to the user's settings on the slider-bars are preferably selected.

U.S. Pat. No. 5,963,957, "BIBLIOGRAPHIC MUSIC DATA BASE WITH NORMALIZED MUSIC THEMES", issued Oct. 5, 1999 to Mark B. Hoffberg, and incorporated by reference herein, presents a characterization system that is based on the musical characteristics of each song, such as a sequence of notes of the song that are memorable. A user provides an input sequence by humming, manipulating keys on a keyboard, tapping the rhythm, and so on, and the system attempts to match the user's input sequence to a particular song in the collection. For example, Beethoven's Fifth Symphony is characterized by a sequence of introductory notes, and the system retrieves the symphony when a user provides a "DA-DA-DA$_{DUMMM}$" musical phrase. In like manner, the system can be configured to retrieve a list of songs that have similar characteristics to the user's input sequence. In the context of this disclosure, a system can be configured to randomly play back each of the songs in a list that is created by the user's input sequence.

Although an automated playback system may be configured to play songs that match a select set of subjective or objective criteria, the playback of these songs is rarely perceived as a professional presentation, such as provided by a professional disk-jockey. Professional disk-jockeys at entertainment functions often provide a mix of songs that corresponds to a selected theme, or set of characteristics, but the sequencing of the songs by a professional is rarely perceived as being "random", per se. A professional disk-jockey, for example, will generally avoid sequencing a song that is discordant with, or otherwise musically contrary to, the preceding song. Preferably, one song leads into another, thereby providing a generally continuous playback of songs, without bringing attention to the transition between songs, and often allowing dancers to continue to dance through the transition between songs without abruptly changing their step.

BRIEF SUMMARY OF THE INVENTION

It is an object of this invention to provide a system and method for sequential playback of songs that minimizes discontinuities between songs. It is a further object of this invention to provide a system and method for sequential playback of songs that provides a musically consistent transition between songs. It is yet another object of this invention to provide an automated play-list creation service in a networked environment.

These objects, and others, are achieved by a sequential playback system that is configured to select each sequential song based upon characteristics of an ending segment of the preceding song. Songs are selected based on the characteristics of the overall theme of the selection, if any, and also based on a musical correspondence between songs. The correspondence may be based on the rhythm of each song, the key of each song, and other musical characteristics of the songs. The end segment of each selected song is characterized, and the first segment of a candidate song that satisfies the overall selection criteria is compared to this characterization to determine a correspondence. If the first segment of the candidate song is inconsistent with the end segment of the previously selected song, another candidate song is found that satisfies the overall selection criteria, and the first segment of this new candidate song is compared to the characterization. This process continues until a suitable candidate song is identified, or until a time limit is exceeded. Transition pieces are optionally provided to facilitate a smooth transition between songs. These transition pieces may be generated directly, retrieved from a library, or provided as part of a commercial Internet service, that includes a playlist-creation process.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
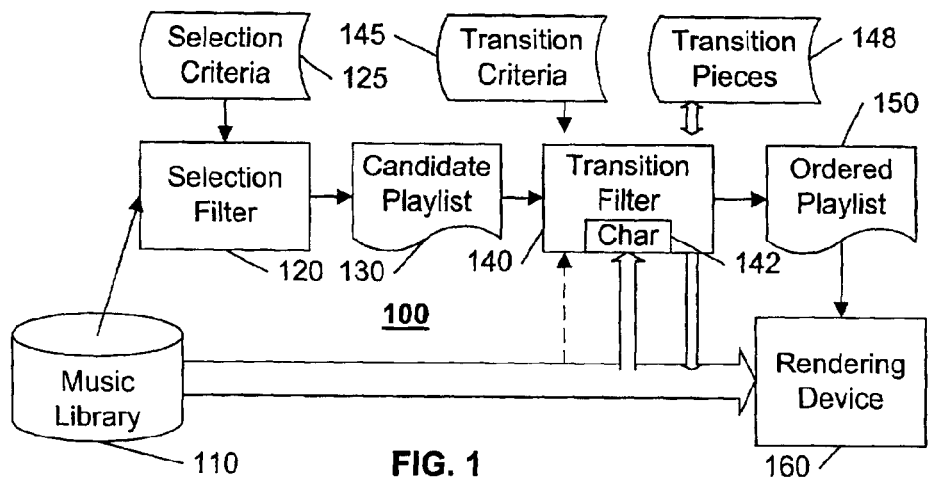
FIG. 1 illustrates an example block diagram of a playback system in accordance with this invention.

FIG. 1 illustrates an example block diagram of a playback system 100 in accordance with this invention. In the example system 100, a rendering device 160 is configured to render selections from a music library 110, the selections corresponding to an ordered playlist 150. The rendering device 160 may be a device such as an audio amplifier that provides audible sound via loudspeakers or headphones, or it may be a device that provides a copy of the sequence of selections in the original or a transformed format as found in the music library 110, such as a recorder for copying the selections to a CD, a memory device, a portable player, other systems on a network, and so on.

For ease of understanding, the term "playlist" is used for illustrative purposes, and includes physical or virtual lists. That is, the list may correspond to physical storage locations that are used to contain an identification of multiple selections, or, the list may correspond to a one-at-a-time identification of a "next" selection, these sequential identifications forming a virtual list.

As in a conventional playback system, a selection filter 120 is optionally used to create a subset 125 of the available selections in the music library 110, based on one or more selection criterion 125. If no selection criterion is provided, the subset 125 of candidate selections for rendering corresponds to the entirety of the music library 110. As discussed above, the selection criteria is generally based on one or more objective or subjective characterizations of the type of music that the user is currently desires. The criteria may also include membership in a user defined set of songs, such as "favorites", "memories", etc., which do not necessarily have a discernible common characterization. Alternatively, a user may identify a particular song as a "seed" from which subsequent songs are selected, and the playback system automatically identifies a set of selection criteria, based on characteristics of the seed-song. Such an alternative is particularly well suited for the use of a "DJ" button on the playback system, or on a remote control device. When the user hits the "DJ" button, the currently playing song becomes the seed-song, and subsequent songs are selected based on the characteristics of the currently playing song.

The music library 110 may be any collection of songs. For ease of presentation and understanding, the library 110 is presented herein as a single collection of songs having a common format. One of ordinary skill in the art will recognize, however, that the library 110 may be distributed among a variety of devices, and may comprise recordings on a variety of media, in a variety of formats. For example, the library 110 may include audio recordings in analog or digital format, and may include MP3, WMA, RM, and other compressed format encodings, and may be located on a local hard disk, a portable player, an Internet site, a network storage device, or it may be a collection of CDs or other recordings in a juke-box, and so on. The library 110 may also include devices or components that are configured to provide the selections in any one of a variety of formats, using techniques known in the art for converting recording formats as desired.

In accordance with this invention, a transition filter 140 is configured to select each successive selection from among the candidate selections 130 based on the immediately prior selection. The transition filter 140 selects each successive selection based on one or more transition criteria 145, so as to provide for an acoustically pleasing transition between songs. Generally, the criteria 145 are designed to provide a "seamless", or "smooth" transition between songs, although for some applications, a user may desire an accentuated transition, to highlight each song. For ease of reference and understanding, unless otherwise noted, the transition criteria 145 are hereinafter assumed to be designed to provide a smooth transition between songs.

The criteria 145 include any of a variety of audio characteristics, including a rhythm pattern, note or chord patterns, tempo, loudness, primary instrument, voice, and so on. A characterization device 142 extracts the appropriate audio characteristics from the currently selected and potential successive selections. When a song is found to have audio characteristics that satisfy the transition criteria 145 relative to a currently selected song, the transition filter 140 adds this song as the next successive song to an ordered playlist 150. As noted above with regard to the candidate playlist 130, the ordered playlist 150 may be a physical list, or a virtual list. By selecting each song based on musical characteristics of each preceding song, an acoustically pleasing sequence of songs are rendered by the rendering device 160.

In accordance with another aspect of this invention, the transition filter 140 is also configured to insert transition pieces 148 between each song, to further smooth (or accentuate) the transition between songs. In a straightforward embodiment of this aspect of the invention, the transition piece 148 is created by decreasing the volume/loudness at the end of each song (fading-out), then increasing the volume/loudness at the start of the next song (fading-in). In a more complex embodiment, an ending segment of a song and a beginning segment of the next song are extracted, and the transition piece 148 is created by blending particular characteristics of the extracted segments. For example, a transition piece 148 may be created by blending the beat pattern between the songs. The difference between the beat patterns in each segment can be determined, and the transition piece 148 can be created to have a beat pattern that gradually changes from the ending segment's beat pattern to the beginning segment's beat pattern. In addition to providing an acoustically pleasing result, a gradual beat pattern change allows dancers to smoothly transition from one song to another without an abrupt change in step. In another embodiment, the musical tone of each song is used to avoid discordance at each transition. The ending chord of the ending song is compared to the initial chord of the next song, and, if required, a "progression" of one or more chords is created to provide the appropriate transition between the chords. As would be evident to one of ordinary skill in the art, the transition piece 148 may include a combination of multiple transition filter effects. For example, the transition piece 148 may include the aforementioned fade, beat, and chord transition effects.

The transition piece 148 may be appended to the ending song, or it may replace some or all of the extracted sequences. In a preferred embodiment of this invention, an ending segment of a song is characterized for comparison with the characteristics of a beginning segment of a potential next song. If the segments are similar, based on the transition criteria 145, a transition piece 148 is created using the ending segment and the characteristics of this next song. An ending portion of the ending segment is modified to effect the aforementioned gradual transition (such as the modified beat pattern and/or the progression chords) to the characteristics of the next song. The transition filter 140 replaces the ending sequence of the ending song with this modified ending segment. This replacement may be effected by substituting the modified ending sequence into the current selection before it is provided to the rendering device 160; or, the modified ending sequence can be added to the ordered playlist 150, after the current selection, and the rendering device 160 can be instructed to terminate the current selection immediately prior to the original ending sequence.

Other techniques for inserting a transition piece 148 between two songs will be evident to one of ordinary skill in the art in view of this disclosure.

The size of the ending portion of the ending segment that is modified is dependent upon the characteristic that is being blended between the songs, and the criteria used for selecting a relatively similar next-song. For example, a transition criterion 145 designed to avoid discordance may constrain the initial chord of the next-song to be within a progression length of not more than one chord from the ending chord of the current song; a rhythm-based transition criteria may constrain the beats-per-second of the beginning of the next-song to be within a given percentage of the beats-per-second of the ending of the current song; and so on. In the beats-per-second transition example, the criteria may also impose a maximum rate-of-change in the transition piece, which will then determine a minimum length of the transition piece based on the amount of change and the rate-of-change.

To reduce processing time, the characteristics of the ending and starting segments of each song may be stored as meta-data associated with the music library 110. This characterization may be performed when the selection is entered into the library 110, or when the selection is first characterized by the transition filter 140. The transition filter 140 uses the pre-determined characteristics of the selection, if available, to select an appropriate next-song, as indicated by the dashed arrow in FIG. 1, thereby bypassing the characterization device 142. Typically, the transition filter 140 selects an appropriate next-song while the current song is being rendered. By reducing the processing time, the transition filter 140 has the opportunity to conduct a longer search, if required, to find an appropriate next-song. In a preferred embodiment of this aspect of the invention, techniques are applied to avoid the repetition of the same sequence of songs over time. For example, the candidate playlist may be randomly ordered each time a sequence is being prepared, or, multiple next-song candidates are identified and a random selection process is used to select from among the multiple candidates. Other techniques of avoiding repetition will be evident to one of ordinary skill in the art.

In like manner, pre-determined transition pieces 148 may be stored for subsequent retrieval, thereby further reducing the processing time. Additionally, a pre-defined set of transition pieces 148 may be created and stored for achieving special transitional effects. Preferably, these special transitional pieces will be parameterized, so that a transition piece 148 for a specific transition can be created by providing an appropriate set of parameters. For example, to distinguish each song while still providing an acoustically pleasing transition, a relatively long (e.g. 15 seconds) "generic" transition piece may be inserted between each song, and this generic piece may be parameterized by the number of beats-per-second in the current song and the next-song, the ending and beginning chord, the voice of the current song, and so on. Such specialized pieces are particularly effective for providing dance-transitions between songs, for example, to provide a transition sequence from a waltz to a ballard, a lindy to a polka, and so on. Note that the use of a relatively long transition piece obviates, or at least lessens, the need for the next-song to correspond to the current song, because the relatively long transition time allows for substantial differences between the current song and the substantially-later-to-perceive next-song.

The function blocks of FIG. 1 may be contained within a single component, such as a personal computer, or a multi-media processing system, or they may be distributed among a variety of components and systems. As would be evident to one of ordinary skill in the art, for example, the principles of this invention are particularly well suited for implementation in a home networking environment, such as a UPnP-enabled network. In such an embodiment, the transition filter 140 operates as a UPnP Control-Point device that interacts with a Content-Directory service on a UPnP Media-Server device to search for suitable sequential selections and transition pieces.

The creation of an ordered playlist 150 that corresponds to an acoustically pleasing sequence of songs, with optional transition pieces, also provides opportunities for commercial enterprises. For example, an Internet web-site may be configured to provide the ordered playlist 150, upon receipt of a catalog of a user's music library 110, and an identification of the user's selection criteria, if any. The web-site may extract the beginning and ending segments of each song to effect the proper selection of songs and transition pieces, or it may have access to a library of beginning and ending segments and only extracts segments for the user's songs that are not found in this library. The newly extracted segments are preferably added to the library, thereby increasing the likelihood that the web-site has access to each segment subsequently processed.

As the principles of this invention become well established, shorthand encoding schemes may be used to characterize beginning and ending segments as meta-data that is associated with the segments, thereby obviating the need to transmit the actual contents of the segments. As a commercial enterprise, the set of transition pieces 148 that are available for transitioning between songs at an Internet site may be substantially more extensive than might be available at the user's equipment, thereby providing an added service to the user. Also, as an option to encourage the use of this sequencing service, the web-site of this invention may be configured to provide songs from other music libraries, in addition to, or in lieu of, the user's music library. These additional songs may be provided free, of may be provided as a recommendation for purchase by the user.

Figure 2:
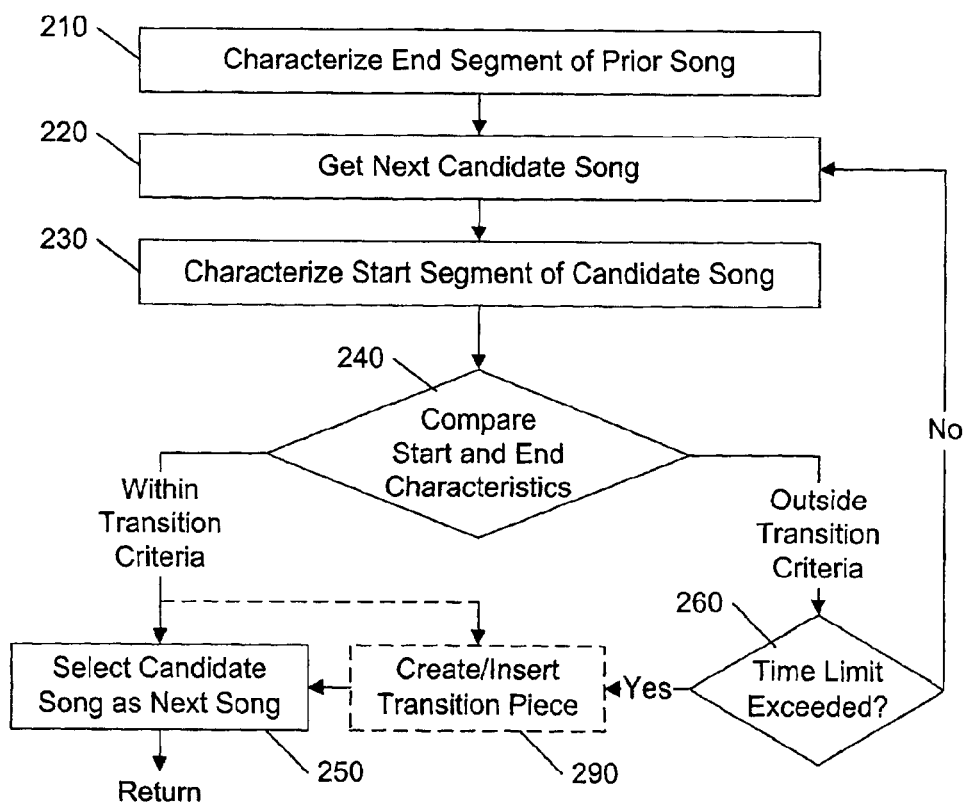
FIG. 2 illustrates an example flow diagram of a playback system in accordance with this invention.

FIG. 2 illustrates an example flow diagram of a playback system in accordance with this invention. The end segment of a prior-song is characterized, at 210. At 220, the next song in the candidate playlist is selected, and a start segment of this song is characterized, at 230. As discussed above, each of the steps 210, 230 may be replaced by a read of a pre-characterization of the prior and candidate songs, respectively. At 240, the characteristics of the beginning segment are compared to the characteristics of the ending segment.

As discussed above, the comparison 240 is based on a set of transition criteria, such as the number of beats per second, the dance rhythm, the chord patterns, and so on. As noted above, generally the transition criteria are designed to effect a smooth transition between songs, but may also be designed to effect noticeable transitions. For example, the beats-per-second transition criteria may be structured to effect a distinctive change of beat between songs, to provide diversity among the selected songs. This criteria may be combined with other criteria, including criteria that seeks similarity. In the preceding change-the-beat example scenario, the user may, for example, set a tight chord-matching criteria, thereby achieving diversity without discordance.

In accordance with one aspect of this invention, when a candidate song exhibits a suitable set of characteristics, at 240, this song is selected as the next-song, at 250, and the selection process returns this selection to the rendering device for rendering when the current song is completed.

In accordance with another aspect of this invention, as discussed above, a transition piece may be inserted between selected songs, as illustrated at block 290 in FIG. 2. Preferably, an ending segment of the current song is replaced by a modified segment that includes the transition piece.

If, at 240, the beginning segment of the candidate song is not within the transition criteria, the next candidate song is analyzed, provided that sufficient time remains for performing this analysis. Generally, the selection process for the next-song occurs while the current song is being rendered. Obviously, the next-song should be selected before the end of the current song, and, if a transition piece is to be added, within a sufficient timespan before the ending segment of the current song to allow for the creation and insertion of a modified ending segment. If, at 260, it is determined that sufficient time remains for analyzing the next candidate selection, the next candidate selection is selected for characterization, at 220, and the above describe process continues.

If, at 260, it is determined that there is insufficient time remaining to analyze another candidate selection, the current candidate selection is selected as the next selection, to prevent a gap in the rendering of songs. Alternatively, as each candidate selection is processed and rejected, it is ranked relative to the other rejected candidates, and the candidate selection that is 'closest' to being within the transition criteria is identified. When insufficient time remains for further analyses of candidate selections, this identified closest candidate is selected as the next-song. If the optional transition pieces are being provided, at 290, an "if-all-else-fails" transition piece is provided. In a preferred embodiment, for example, the filter 140 is configured to effect the above described fade-out-fade-in transition, regardless of the criteria 145, whenever a suitable next-song cannot be found within the available time.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the presentation above, a "static" set of transition criteria is assumed. One of ordinary skill in the art will recognize that the number of selections in the candidate playlist 130 will affect the likelihood of finding a next-song that satisfies the given set of transition criteria 145. Also, the range of variability among the selections in the candidate playlist 130 will affect the likelihood of finding a next-song that satisfies the criteria 145. To achieve an acceptable degree of success in finding an appropriate next-song, or to allow the use of tighter criteria within an acceptable degree of success, the transition criteria 145 may be dynamically adjusted, based on the size of the candidate playlist 130, or based on the ease, or difficulty, encountered in finding prior next-songs that satisfy the criteria 145. One of ordinary skill in the art will also recognize that the particular structure and flow provided in the figures are presented for illustrative purposes, and alternative structures are feasible. For example, the transition piece 148 is presented as a single entity, whereas it may be structured as two discrete pieces: one that conforms to the ending sequence and one that conforms to the beginning sequence. In such an embodiment, the ending piece may be configured to bring the ending segment to a "neutral" state, and the beginning piece is configured to transition from this neutral state to the beginning segment of the next-song. In such an embodiment, the transition criteria can be substantially relaxed, or eliminated. These and other system configuration and optimization features will be evident to one of ordinary skill in the art in view of this disclosure, and are included within the scope of the following claims.

We claim:

1. A playback system comprising:

a transition filter, operably coupled to a library of songs, that is configured to identify a playlist comprising a sequence of songs from the library of songs that have been selected and arranged such that a pair of sequential songs have a desired transition, and a rendering device, operably coupled to the transition filter and the library of songs, that is configured to playout select songs from the library of songs in the sequence identified by the transition filter;

wherein the transition filter is configured to select each subsequent song in the sequence of songs based on one or more characteristics of an immediately prior song and of each subsequent song, the transition filter further configured to modify at least a portion of the immediately prior song to provide a transition piece based on one or more characteristics of the immediately prior song and the one or more characteristics of the subsequent song.

2. The playback system of claim 1, further including a selection filter, operably coupled to the library of songs and the transition filter, that is configured to provide a subset of the library of songs, based on one or more selection criteria, and wherein the transition filter is configured to identify the sequence of songs from the library of songs based on the subset provided by the selection filter.

3. The playback system of claim 1, further including a selection filter, operably coupled to the library of songs and the transition filter, that is configured to provide a subset of the library of songs, based on one or more selection criteria, and wherein the transition filter is configured to identify the sequence of songs from the library of songs based on the subset provided by the selection filter.

4. The playback system of claim 1, wherein the one or more characteristics of the immediately prior song and the one or more characteristics of the subsequent song include at least one of:

a note pattern, a chord pattern, a beat pattern, a rhythm pattern, a dance pattern, a tempo, a timbre, a voice, a loudness, and an instrument-type.

5. The playback system of claim 1, wherein the one or more characteristics of the immediately prior song are based on an ending segment of the immediately prior song, and the one or more characteristics of the subsequent song are based on a beginning segment of the immediately prior song.

6. The playback system of claim 1, wherein at least one of the one or more characteristics of the immediately prior song and the one or more characteristics of the subsequent song is based on a previously determined characterization of the corresponding song.

7. The playback system of claim 1, wherein the rendering device includes at least one; an audio amplifier, an audio recorder, a digital recorder, a memory programmer, a network interface, a formatter, and an encoder.

8. The playback system of claim 1, further including a transition activation device that is configured to identify a song that is currently being rendered by the playback system as a first immediately prior song, from which the sequence of songs is subsequently determined.

9. A playback system comprising:
a transition filter, operably coupled to a selected and arranged library of songs, that is configured to provide a transition piece between each immediately prior song and each subsequent song in a sequence of songs from the library of songs, and
a rendering device, operably coupled to the transition filter and the library of songs, that is configured to playout each song of the sequence of songs from the library of songs, and each transition piece between songs from the transition filter,
wherein
the transition filter is configured to provide each transition piece based on one or more characteristics of the immediately prior song, wherein the transition piece is based on a modification of at least a portion of the immediately prior song.

10. The playback system of claim 9, wherein the transition filter is further configured to provide the transition piece based on one or more characteristics of the each subsequent song.

11. The playback system of claim 10, wherein the one or more characteristics of the immediately prior song and the one or more characteristics of the subsequent song include at least one of:
a note pattern, a chord pattern, a beat pattern, a rhythm pattern, a dance pattern, a tempo, a timbre, a voice, a loudness, and an instrument-type.

12. The playback system of claim 10, wherein the one or more characteristics of the immediately prior song are based on an ending segment of the immediately prior song, and
the one or more characteristics of the subsequent song are based on a beginning segment of the immediately prior song.

13. The playback system of claim 10, wherein at least one of the one or more characteristics of the immediately prior song and the one or more characteristics of the subsequent song is based on a previously determined characterization of the corresponding song.

14. The playback system of claim 9, wherein the transition piece is configured to replace an ending portion of the immediately prior song.

15. A transition system comprising:
a characterization device that is configured to determine one or more characteristics of a first song and a second song,
a transition filter that is configured to compare the characteristics of the second song to the characteristics of the first song to determine whether the second song is suitable for successively following the first song, based on one or more transition criteria, and to create a playlist comprising a selected and arranged sequence of songs, with a pair of sequential songs having a desired transition, wherein the transition filter is further configured to modify at least a portion of the first song to provide a transition piece based on the one or more characteristics of the first song and the second song.

16. The transition system of claim 15, wherein the characterization device includes at least one of:
an analyzer that determines the one or more characteristics of at least one song of the first song and the second song, based on an analysis of a segment of the at least one song, and
a reading device that is configured to read the one or more characteristics of at least one song of the first song and the second song from a previous characterization of the at least one song.

17. The transition system of claim 15, wherein the transition filter is further configure to replace an ending portion of the first song with the transition piece.

18. The transition system of claim 15, wherein the one or more characteristics of the first and second songs include at least one of:
a note pattern, a chord pattern, a beat pattern, a rhythm pattern, a dance pattern, a tempo, a timbre, a voice, a loudness, and an instrument-type.

19. A method of selecting a subsequent song to a current song, comprising:
determining one or more characteristics associated with the current song,
determining one or more characteristics associated with a candidate song of a plurality of candidate songs,
providing a comparison of the one or more characteristics associated with the current song and the candidate song, and
selecting and arranging a candidate song as the subsequent song to the current song based on the comparison such that the selected songs playout with a desired transition, and
providing a transition piece including a modification of at least a portion of the current song based on the one or more characteristics associated with the current song and the subsequent song.

20. The method of claim 19, further including replacing an ending portion of the current song with the transition piece.

21. The method of claim 19, wherein the one or more characteristics associated with the current song and the candidate song include at least one of:
a note pattern, a chord pattern, a beat pattern, a rhythm pattern, a dance pattern, a tempo, a timbre, a voice, a loudness, and an instrument-type.

22. A method of providing a song-sequencing service to a user, comprising:
identifying a plurality of songs that are available for rendering,
determining one or more characteristics associated with a first song of the plurality of songs,
determining one or more characteristics associated with a candidate song of the plurality of songs,
determining a comparison of the one or more characteristics associated with the first song and the candidate song, and
creating a sequence of songs comprising a playlist by selecting and arranging the candidate song as a next-subsequent song to the current song based on the comparison such that the selected songs playout with a desired transition, and
providing a transition piece including a modification of at least a portion of the first song based on the one or more characteristics associated with the first song and the next-subsequent song.

23. The method of claim 22, further including replacing an ending portion of the first song with the transition piece.

24. The method of claim 22, wherein the one or more characteristics associated with the first song and the candidate song include at least one of:

a note pattern, a chord pattern, a beat pattern, a rhythm pattern, a dance pattern, a tempo, a timbre, a voice, a loudness, and an instrument-type.

25. The method of claim 22, wherein identifying the plurality of songs is based on one or more user selection criteria.

26. A computer program for use in a computer system that, when executed on the computer system, causes the computer system to:

determine one or more characteristics of a first song, determine one or more characteristics of one or more candidate songs, and create a sequence of songs comprising a playlist by selecting and arranging a next-subsequent song to the first song from among the one or more candidate songs, based on the one or more characteristics of the first song and the one or more characteristics of the one or more candidate songs such that a pair of sequential songs playout with a desired transition, wherein the computer program further causes the computer system to provide a transition piece including a modification of at least a portion of the first song based on the one or more characteristics of the first song and the one or more characteristics of the next-subsequent song.

27. The computer program of claim 26, wherein the one or more characteristics associated with the first song include at least one of:

a note pattern, a chord pattern, a beat pattern, a rhythm pattern, a dance pattern, a tempo, a timbre, a voice, a loudness, and an instrument-type.

* * * * *